(12) United States Patent
Sasaki

(10) Patent No.: US 10,000,249 B2
(45) Date of Patent: Jun. 19, 2018

(54) BICYCLE PEDAL

(71) Applicant: Shimano Inc., Sakai, Osaka (JP)

(72) Inventor: Bungo Sasaki, Osaka (JP)

(73) Assignee: Shimano Inc., Osaka (JP)

( * ) Notice: Subject to any disclaimer, the term of this patent is extended or adjusted under 35 U.S.C. 154(b) by 46 days.

(21) Appl. No.: 14/466,114

(22) Filed: Aug. 22, 2014

(65) Prior Publication Data

US 2016/0052583 A1    Feb. 25, 2016

(51) Int. Cl.
| | |
|---|---|
| *G01L 5/22* | (2006.01) |
| *B62J 99/00* | (2009.01) |
| *B62M 1/36* | (2013.01) |
| *G05G 1/30* | (2008.04) |
| *B62M 3/00* | (2006.01) |
| *B62M 3/08* | (2006.01) |

(52) U.S. Cl.
CPC ............... *B62J 99/00* (2013.01); *B62M 1/36* (2013.01); *B62M 3/00* (2013.01); *B62M 3/08* (2013.01); *G01L 5/225* (2013.01); *G05G 1/30* (2013.01); *B62J 2099/002* (2013.01); *B62K 2207/00* (2013.01)

(58) Field of Classification Search
CPC ...... B62J 2099/002; G01L 5/225; G05G 1/30; B62M 1/36; B62M 3/08; Y10T 74/2164; Y10T 74/2168
See application file for complete search history.

(56) References Cited

U.S. PATENT DOCUMENTS

| | | |
|---|---|---|
| 8,011,242 B2 | 9/2011 | O'Neill et al. |
| 8,327,723 B2 | 12/2012 | Roudergues et al. |
| 2002/0107085 A1* | 8/2002 | Lee .................... A63B 24/0003 473/221 |

(Continued)

FOREIGN PATENT DOCUMENTS

| | | | |
|---|---|---|---|
| CN | 1900670 | * 1/2007 | ............... G01L 1/22 |
| DE | 44 35 174 A1 | 3/1996 | |

(Continued)

OTHER PUBLICATIONS

Machine Translation of CN 1900670, obtained Feb. 19, 2016.*
Machine Translation of DE 44 35 174, obtained Dec. 21, 2017.*

*Primary Examiner* — Richard W Ridley
*Assistant Examiner* — Brian J McGovern
(74) *Attorney, Agent, or Firm* — Global IP Counselors, LLP

(57) ABSTRACT

A bicycle pedal is provided with a pedal spindle, a pedal body, a first shear force sensor, a second shear force sensor, a first bending force sensor and a second bending force sensor. The pedal spindle includes a crank arm mounting part. The pedal body is rotatably mounted on the pedal spindle about a center spindle axis. The first and second shear force sensors are arranged relative to the pedal spindle to detect first and second shear components of a pedaling force with respect to the center spindle axis. The first bending force sensor is arranged relative to the pedal spindle to detect a first bending component of the pedaling force with respect to the center spindle axis. The second bending force sensor is arranged relative to the pedal spindle to detect a second bending component of the pedaling force with respect to the center spindle axis.

22 Claims, 9 Drawing Sheets

(56) References Cited

U.S. PATENT DOCUMENTS

| | | | | |
|---|---|---|---|---|
| 2009/0031819 | A1* | 2/2009 | Shimazu | G01L 1/18 73/777 |
| 2010/0024590 | A1* | 2/2010 | O'Neill | G01L 3/242 74/594.1 |
| 2010/0282001 | A1* | 11/2010 | Sasaki | B62K 19/34 73/862.49 |
| 2012/0166105 | A1* | 6/2012 | Biermann | A63B 24/0062 702/43 |
| 2012/0173167 | A1* | 7/2012 | Lukatela | G01L 3/108 702/42 |
| 2012/0210784 | A1 | 8/2012 | Kokkoneva et al. | |
| 2012/0285264 | A1* | 11/2012 | Sasaki | B62M 9/131 73/862.045 |
| 2012/0285265 | A1* | 11/2012 | Sasaki | B62M 3/003 73/862.045 |
| 2013/0024137 | A1* | 1/2013 | Grassi | G01L 3/108 702/43 |
| 2013/0197744 | A1 | 8/2013 | Tuulari et al. | |

FOREIGN PATENT DOCUMENTS

| | | |
|---|---|---|
| DE | 101 58 600 A1 | 6/2003 |
| WO | 2009/083787 A1 | 7/2009 |
| WO | 2010/014964 A2 | 2/2010 |

* cited by examiner

BICYCLE PEDAL

BACKGROUND

Field of the Invention

This invention generally relates to a bicycle pedal. More specifically, the present invention relates to a bicycle pedal that detects a cyclist's pedaling force.

Background Information

Bicycles are sometimes equipped with various sensors for providing information to the rider about various aspects of the bicycle. One such sensor is a torque or force sensor for detecting a pedaling force of the rider. Various sensing arrangements have been proposed for detecting a pedaling force of the rider. For example, pedaling force measurement devices are in disclosed in U.S. Pat. Nos. 7,516,677, 8,011,242 and 8,327,723.

SUMMARY

Generally, the present disclosure is directed to various features of a bicycle pedal. In one feature, a bicycle pedal is provided that detects a cyclist's pedaling force. It has been discovered that when a shear force on a pedal spindle is detected by a sensor, an output signal of the sensor changes based on a where a center position of the rider's pedaling force is applied to the pedal spindle with respect to an axial direction of the pedal spindle.

In view of the state of the known technology and in accordance with a first aspect of the present disclosure, a bicycle pedal is provided that basically comprises a pedal spindle, a pedal body, a first shear force sensor, a second shear force sensor, a first bending force sensor, and a second bending force sensor. The pedal spindle includes a crank arm mounting part. The pedal body is rotatably mounted on the pedal spindle about a center spindle axis. The first shear force sensor is arranged relative to the pedal spindle to detect a first shear component of a pedaling force with respect to the center spindle axis. The second shear force sensor is arranged relative to the pedal spindle to detect a second shear component of the pedaling force with respect to the center spindle axis. The first bending force sensor is arranged relative to the pedal spindle to detect a first bending component of the pedaling force with respect to the center spindle axis. The second bending force sensor is arranged relative to the pedal spindle to detect a second bending component of the pedaling force with respect to the center spindle axis.

In accordance with a second aspect of the present invention, the bicycle pedal according to the first aspect is configured so that the first and second shear force sensors are disposed on an outer peripheral surface of the pedal spindle.

In accordance with a third aspect of the present invention, the bicycle pedal according to the first aspect is configured so that the first and second bending force sensors are disposed on an outer peripheral surface of the pedal spindle.

In accordance with a fourth aspect of the present invention, the bicycle pedal according to the third aspect is configured so that the first and second shear force sensors are disposed on the outer peripheral surface of the pedal spindle.

In accordance with a fifth aspect of the present invention, the bicycle pedal according to the fourth aspect is configured so that the first shear force sensor is circumferentially spaced from the second shear force sensor about the outer peripheral surface with respect to the center spindle axis; and the first bending force sensor is circumferentially spaced from the second bending force sensor about the outer peripheral surface with respect to the center spindle axis.

In accordance with a sixth aspect of the present invention, the bicycle pedal according to the fifth aspect is configured so that the pedal spindle further includes a pedal body support part and a sensor support part. The pedal body support part rotatably supports the pedal body. The sensor support part supports the first and second shear force sensors and the first and second bending force sensors. The sensor support part is axially disposed between the crank arm mounting part and the pedal body support part.

In accordance with a seventh aspect of the present invention, the bicycle pedal according to the sixth aspect is configured so that the pedal spindle further includes a first bore extending axially at least through the crank arm mounting part, and at least one second bore extending from the outer peripheral surface of the pedal spindle to the first bore. Each of the first and second shear force sensors and the first and second bending force sensors has a communication line that extends through the at least one second bore and the first bore.

In accordance with an eighth aspect of the present invention, the bicycle pedal according to the seventh aspect is configured so that the at least one second bore includes a plurality of second bores.

In accordance with a ninth aspect of the present invention, the bicycle pedal according to the fifth aspect is configured so that the first and second shear force sensors are selected from the group consisting of resistance strain gauges and semiconductor strain gauges. The first and second bending force sensors are selected from the group consisting resistance strain gauges and semiconductor strain gauges.

In accordance with a tenth aspect of the present invention, the bicycle pedal according to the fifth aspect is configured so that the first and second shear force sensors are disposed ninety degrees apart with respect to the center spindle axis. The first and second bending force sensors are disposed ninety degrees apart with respect to the center spindle axis.

In accordance with an eleventh aspect of the present invention, the bicycle pedal according to the tenth aspect is configured so that the first and second shear force sensors are angularly offset from the first and second bending force sensors with respect to the center spindle axis.

In accordance with a twelfth aspect of the present invention, the bicycle pedal according to the eleventh aspect is configured so that the first shear force sensor is disposed opposite to the first bending force sensor with respect to the center spindle axis. The second shear force sensor is disposed opposite to the second bending force sensor with respect to the center spindle axis.

In accordance with a thirteenth aspect of the present invention, the bicycle pedal according to the fifth aspect further comprises a third shear force sensor, a fourth shear force sensor, a third bending force sensor, and a fourth bending force sensor. The third shear force sensor is arranged relative to the pedal spindle to detect a third shear component of the pedaling force with respect to the center spindle axis. The fourth shear force sensor is arranged relative to the pedal spindle to detect a fourth shear component of the pedaling force with respect to the center spindle axis. The third bending force sensor is arranged relative to the pedal spindle to detect a third bending component of the pedaling force with respect to the center spindle axis. The fourth bending force sensor is arranged relative to the pedal spindle to detect a fourth bending component of the pedaling force with respect to the center spindle axis.

In accordance with a fourteenth aspect of the present invention, the bicycle pedal according to the thirteenth aspect is configured so that the first, second, third and fourth shear force sensors are disposed on an outer peripheral surface of the pedal spindle. The first, second, third and fourth bending force sensors are disposed on an outer peripheral surface of the pedal spindle.

In accordance with a fifteenth aspect of the present invention, the bicycle pedal according to the fourteenth aspect is configured so that the first, second, third and fourth shear force sensors are circumferentially spaced from each other about the outer peripheral surface with respect to the center spindle axis. The first, second, third and fourth shear bending force sensors are circumferentially spaced from each other about the outer peripheral surface with respect to the center spindle axis.

In accordance with a sixteenth aspect of the present invention, the bicycle pedal according to the fifteenth aspect is configured so that the first, second, third and fourth shear force sensors are selected from the group consisting of resistance strain gauges and semiconductor strain gauges. The first, second, third and fourth bending force sensors are selected from the group consisting of resistance strain gauges and semiconductor strain gauges.

In accordance with a seventeenth aspect of the present invention, the bicycle pedal according to the fourteenth aspect is configured so that the first, second, third and fourth shear force sensors are disposed ninety degrees apart with respect to the center spindle axis. The first, second, third and fourth bending force sensors are disposed ninety degrees apart with respect to the center spindle axis.

In accordance with an eighteenth aspect of the present invention, the bicycle pedal according to the first aspect is configured so that the first shear force sensor is angularly aligned with the first bending force sensor with respect to the center spindle axis, and the second shear force sensor is angularly aligned with the second bending force sensor with respect to the center spindle axis.

In accordance with a nineteenth aspect of the present invention, the bicycle pedal according to the first aspect further comprises an inclination sensor attached to one of the pedal body and the pedal spindle.

In accordance with a twentieth aspect of the present invention, the bicycle pedal according to the first aspect further comprises a controller configured to be detachably fixed to the crank arm and in communication with the first and second shear force sensors and the first and second bending force sensors.

In accordance with a twenty-first aspect of the present invention, the bicycle pedal according to the twentieth aspect is configured so that the controller is programmed to calculate a pedaling power during a pedal cycle based on data received from the first and second shear force sensors and the first and second bending force sensors.

In accordance with a twenty-second aspect of the present invention, the bicycle pedal according to the twenty-first aspect further comprises a cadence sensor in communication with the controller.

In accordance with a twenty-third aspect of the present invention, the bicycle pedal according to the first aspect further comprises a wireless transmitter electrically connected to the first and second shear force sensors and the first and second bending force sensors.

In accordance with a twenty-fourth aspect of the present invention, a bicycle pedal spindle is provided that basically comprises a crank arm mounting part, a pedal body support part, and a sensor support part. The pedal body support part is configured to rotatably support a pedal body about a center spindle axis. The sensor support part includes a first shear force sensor, a second shear force sensor, a first bending force sensor, and a second bending force sensor. The first shear force sensor is arranged relative to the pedal spindle to detect a first shear component of a pedaling force with respect to the center spindle axis. The second shear force sensor is arranged relative to the pedal spindle to detect a second shear component of the pedaling force with respect to the center spindle axis. The first bending force sensor is arranged relative to the pedal spindle to detect a first bending component of the pedaling force with respect to the center spindle axis. The second bending force sensor is arranged relative to the pedal spindle to detect a second bending component of the pedaling force with respect to the center spindle axis.

Also other objects, features, aspects and advantages of the disclosed bicycle pedal will become apparent to those skilled in the art from the following detailed description, which, taken in conjunction with the annexed drawings, discloses several embodiments of the bicycle pedal.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
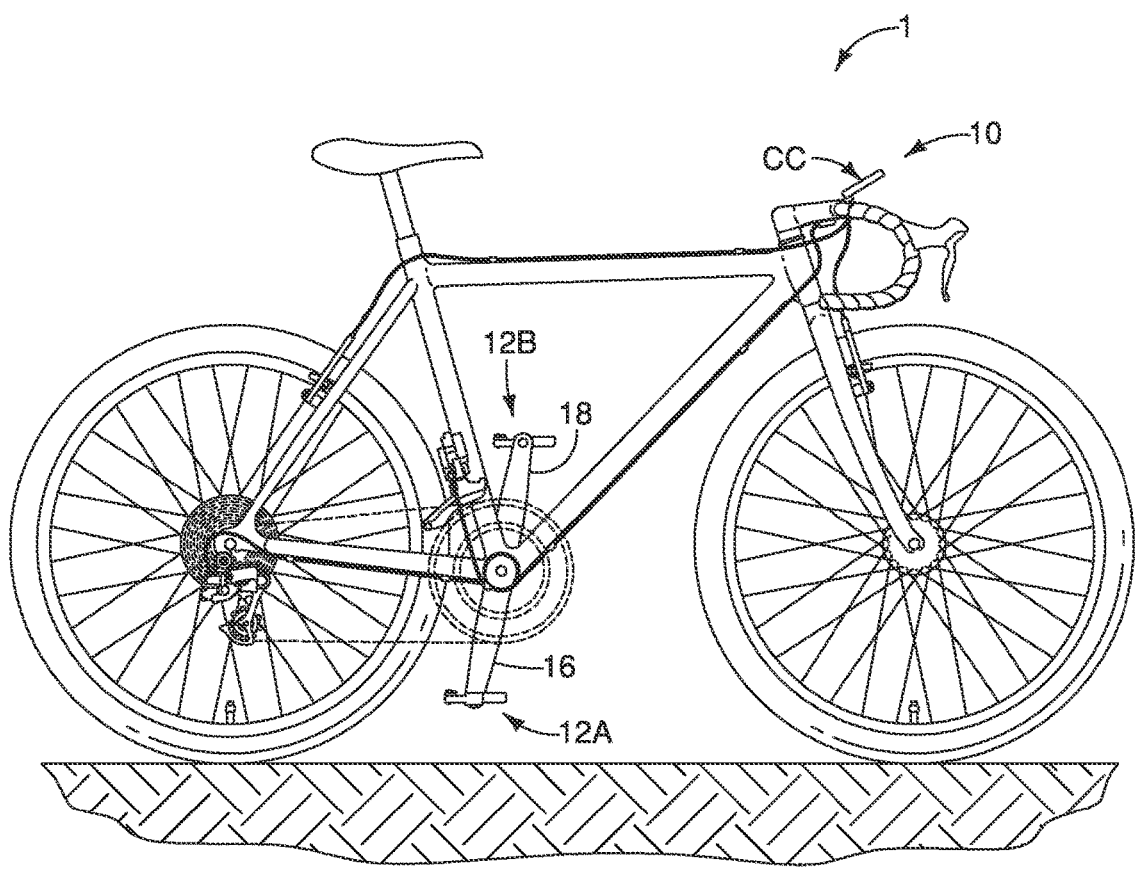
FIG. 1 is a side elevational view of a bicycle that is equipped with a pedaling state detecting apparatus having a pair of bicycle pedals in accordance with one illustrated embodiment.

Referring initially to FIG. 1, a bicycle 1 is illustrated that is equipped with a pedaling state detecting apparatus 10 having a pair of bicycle pedals 12A and 12B in accordance with a first embodiment. While the bicycle 1 illustrated is a road bike, the bicycle pedals 12A and 12B can be used with other types of bicycles as needed and/or desired. In particular, the bicycle pedals 12A and 12B can be installed on both moving bicycles that advance when a rider pedals and stationary bicycles, such as exercise bicycles. The bicycle 1 and its various parts are conventional, except for components of the pedaling state detecting apparatus (i.e., the bicycle pedals 12A and 12B) as discussed herein. Thus, the bicycle 1 and its various parts will not be discussed and/or illustrated in detail herein, except as needed to understand the bicycle pedals 12A and 12B.

The bicycle pedals 12A and 12B are clipless or step-in pedals. In other words, the bicycle pedals 12A and 12B are clipless or step-in pedal that is used with a bicycle shoe (not shown) having a cleat fixedly coupled to the sole of a shoe. Alternatively, the bicycle pedals 12A and 12B can be configured without any cleat engagement structure.

Figure 2:
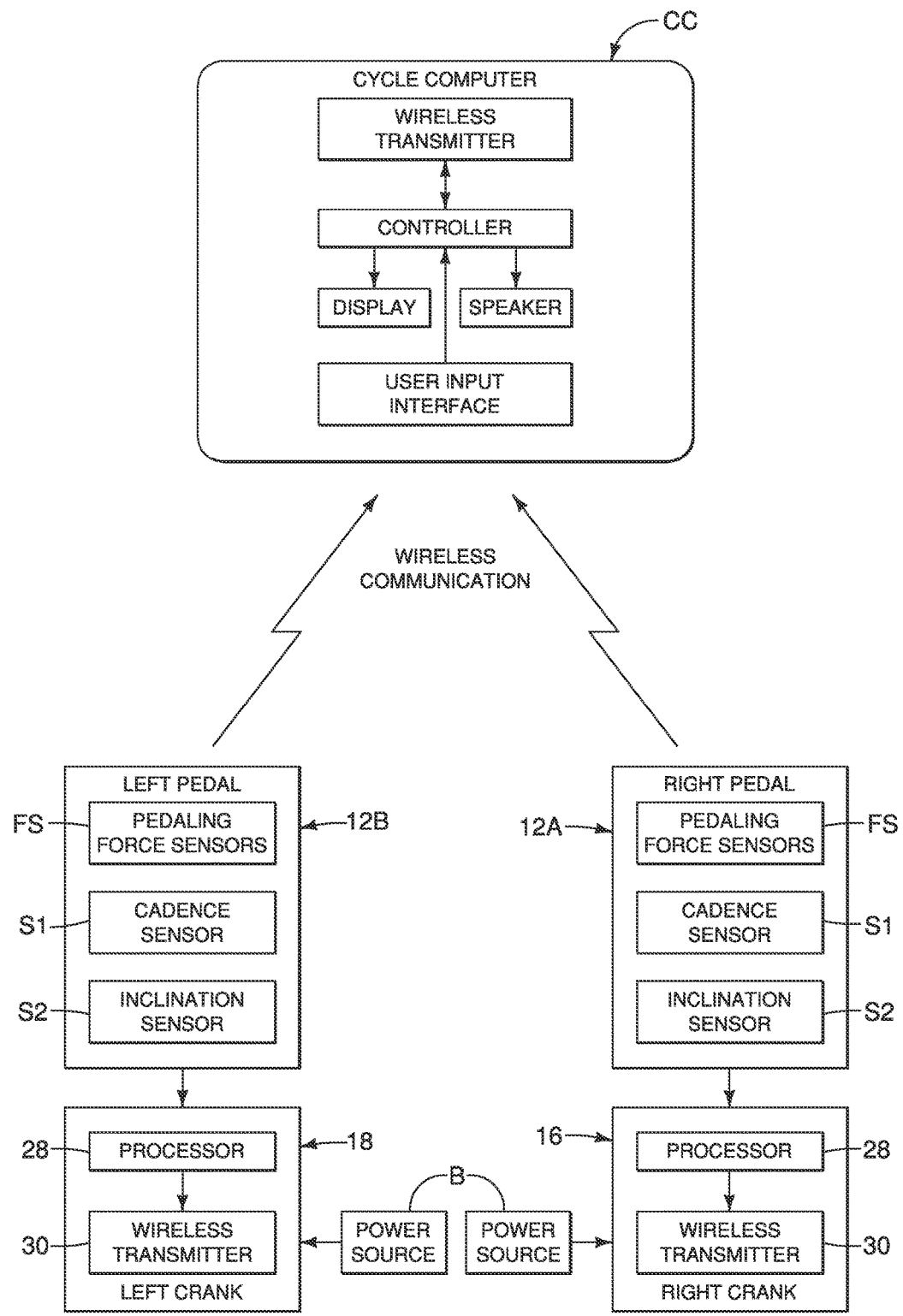
FIG. 2 is a schematic block diagram showing an overall configuration of the pedaling state detecting apparatus illustrated in FIG. 1.

Referring now to FIG. 2, the pedaling state detecting apparatus 10 is schematically illustrated. The pedaling state detecting apparatus 10 uses the bicycle pedals 12A and 12B to notify a rider of the pedaling state of the bicycle 1. Basically, in addition to the bicycle pedals 12A and 12B, the pedaling state detecting apparatus 10 includes a cycle computer CC that wirelessly communicates with the bicycle pedals 12A and 12B for notifying a rider of the pedaling state of the bicycle 1. In particular, the cycle computer CC of the pedaling state detecting apparatus 10 comprises a communication unit (wireless transmitter) and a controller. While the communication unit and the controller are illustrated as a part of the cycle computer CC, the communication unit and the controller can be provided separately from the cycle computer CC. Also alternatively, the communication unit can be connected to the cycle computer CC by one or more communication cords. Since cycle computers are well known in the bicycle field, the cycle computer CC will not be discussed in detail herein.

Figure 3:
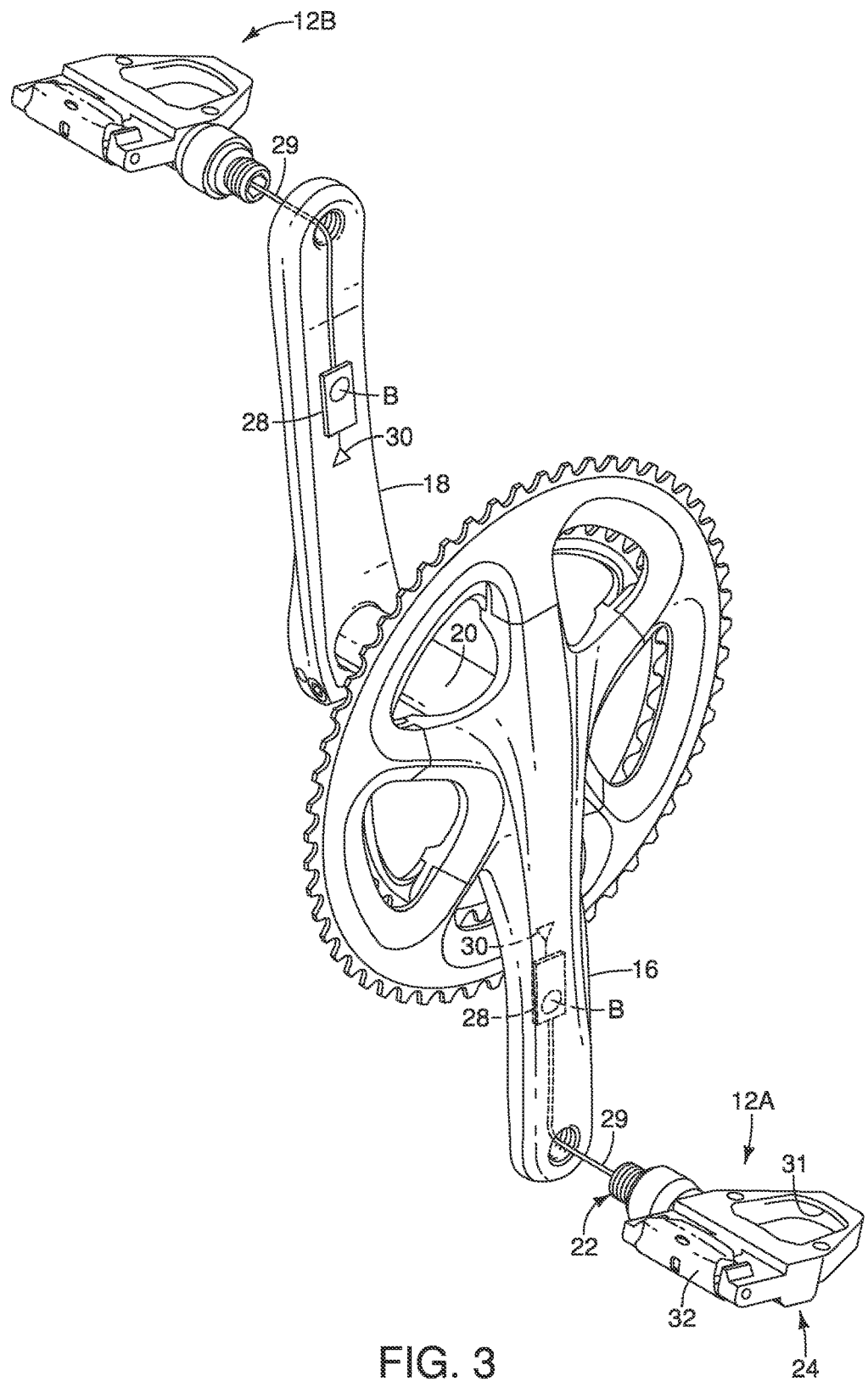
FIG. 3 is an enlarged perspective view of a bicycle crank assembly having the bicycle pedals illustrated FIG. 1.

As seen in FIG. 3, the bicycle pedals 12A and 12B are fixedly coupled to bicycle crank arms 16 and 18 of the bicycle 1, respectively. The crank arms 16 and 18 are fixed to a crankshaft 20 such that the crank arms 16 and 18 rotate together as a unit. Basically, the (right-side) bicycle pedal 12A is a mirror image of the (left-side) bicycle pedal 12B, except that the bicycle pedal 12B uses a left-hand thread connection, while the bicycle pedal 12A uses a right-hand thread connection to help prevent the pedals from becoming loose. For the sake of simplicity, only the bicycle pedal 12A, which is a right-side bicycle pedal, will be illustrated and described herein. Of course, the description of the bicycle pedal 12A applies to the bicycle pedal 12B.

Figure 4:
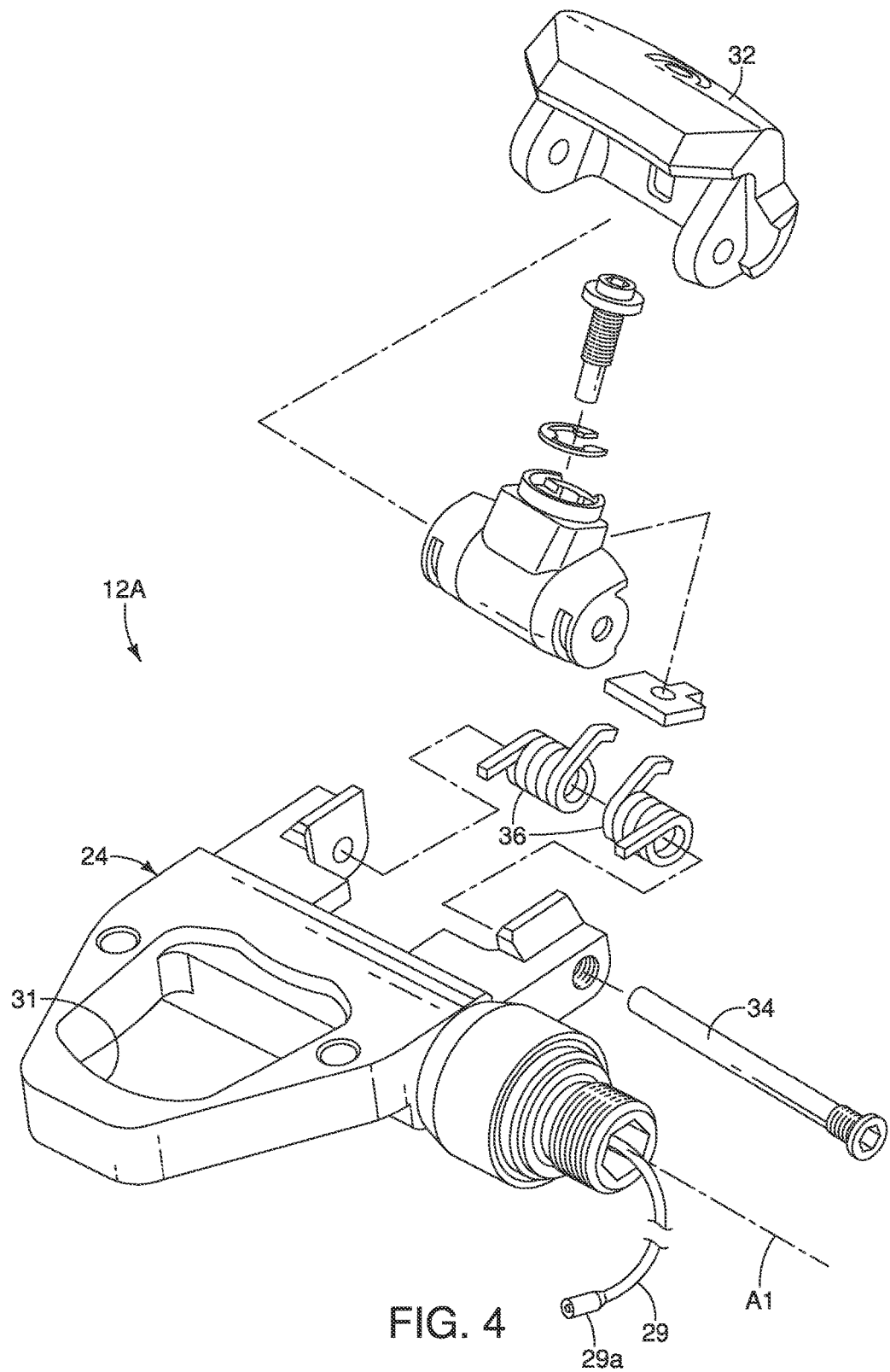
FIG. 4 is an exploded perspective view of one of the bicycle pedals (i.e., the right bicycle pedal) in accordance with the illustrated embodiment.
Figure 9:
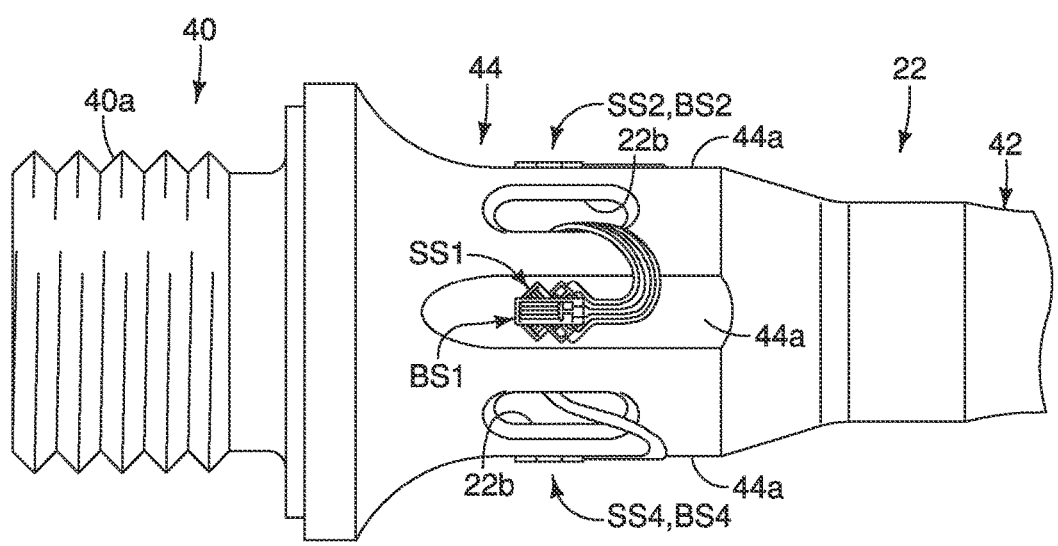
FIG. 9 is an enlarged elevational view of a portion of the pedal spindle illustrated in FIGS. 4 to 8.

Referring to FIGS. 4 and 9, the bicycle pedal 12A basically comprises a pedal spindle 22, a pedal body 24, a first shear force sensor SS1, a first bending force sensor BS1, a second shear force sensor SS2 and a second bending force sensor BS2. In this first embodiment, the bicycle pedal 12A further comprises a third shear force sensor SS3, a fourth shear force sensor SS4, a third bending force sensor BS3, and a fourth bending force sensor BS4. Collectedly, in the drawings, the force sensor SS1, SS2, SS3, SS4, BS1, BS2, BS3 and BS4 will be indicated as FS in FIG. 2. The pedal body 24 is rotatably mounted on the pedal spindle 22 about a center spindle axis A1.

The first, second, third and fourth shear force sensors SS1, SS2, SS3 and SS4 are disposed on an outer peripheral surface of the pedal spindle 22. Likewise, the first, second, third and fourth bending force sensors BS1, BS2, BS3 and BS4 are disposed on an outer peripheral surface of the pedal spindle 22.

The first shear force sensor SS1 is arranged relative to the pedal spindle 22 to detect a first shear component of a pedaling force with respect to the center spindle axis A1. The second shear force sensor SS2 is arranged relative to the pedal spindle 22 to detect a second shear component of the pedaling force with respect to the center spindle axis A1. The first bending force sensor BS1 is arranged relative to the pedal spindle 22 to detect a first bending component of the pedaling force with respect to the center spindle axis A1. The second bending force sensor BS2 is arranged relative to the pedal spindle 22 to detect a second bending component of the pedaling force with respect to the center spindle axis A1. The third shear force sensor SS3 is arranged relative to the pedal spindle 22 to detect a third shear component of the pedaling force with respect to the center spindle axis A1. The fourth shear force sensor SS4 is arranged relative to the pedal spindle 22 to detect a fourth shear component of the pedaling force with respect to the center spindle axis A1. The third bending force sensor BS3 is arranged relative to the pedal spindle 22 to detect a third bending component of the pedaling force with respect to the center spindle axis A1. The fourth bending force sensor BS4 arranged relative to the pedal spindle 22 to detect a fourth bending component of the pedaling force with respect to the center spindle axis A1.

Preferably, as seen in FIG. 3, the bicycle pedal 12A further comprises a controller 28 configured to be detachably fixed to the crank arm 16 and in communication with the first, second, third and fourth shear force sensors SS1, SS2, SS3 and SS4 and the first, second, third and fourth bending force sensors BS1, BS2, BS3 and BS4. Preferably, the controller 28 is mounted on the bicycle facing side of the crank arm 16. The controller 28 is programmed to calculate a pedaling power during a pedal cycle based on data received from the first, second third and fourth shear force sensors SS1, SS2, SS3 and SS4, and the first, second, third and fourth bending force sensors BS1, BS2, BS3 and BS4 as discussed below. Preferably, as seen in FIG. 2, the bicycle pedal 12A further comprises a cadence sensor S1 in communication with the controller 28. Also preferably, the bicycle pedal 12A further comprises an inclination sensor S2 that is in communication with the controller 28. The cadence sensor S1 and the inclination sensor S2 are conventional sensors, and thus, they will only be briefly discussed herein.

Figure 6:
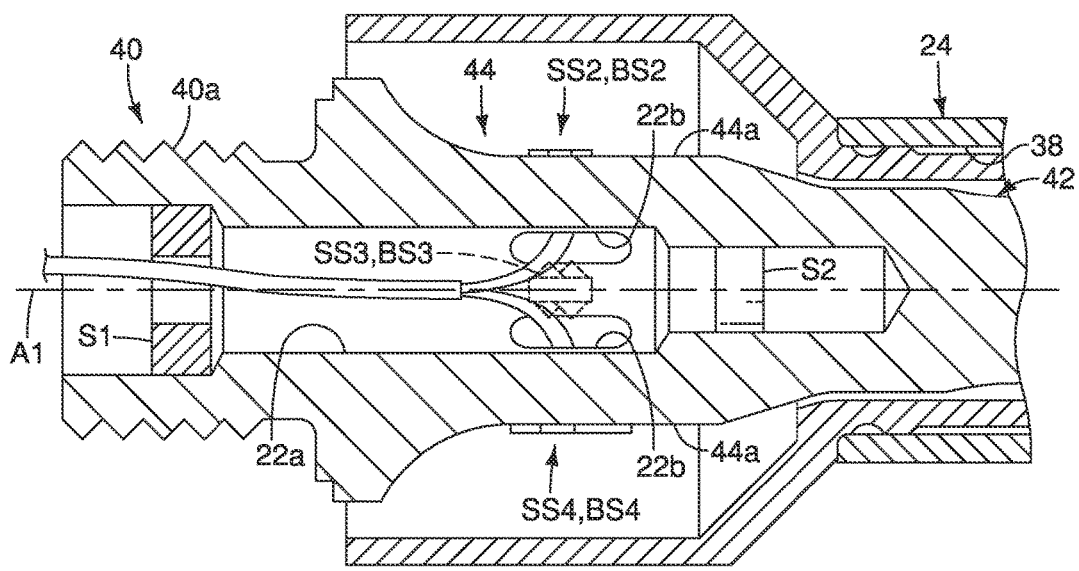
FIG. 6 is a partial cross sectional view of the pedal spindle as seen along center section line 6-6 of FIG. 5.

As seen in FIG. 6, the cadence sensor S1 is a device that detects the revolutions per minute (RPM) of the bicycle pedal 12A about the center crank axis of the crankshaft 20. The cadence sensor S1 can, for example, include a magnetic field detecting device (e.g., a reed switch) that detects a magnetic field of a magnet (not shown) that is attached to the bicycle frame. In the illustrated embodiment, the cadence sensor S1 is fixedly attached to the pedal spindle 22. The cadence sensor S1 can also be disposed on a housing of the controller 28 or on a portion of one of the crank arms 16 and 18.

The inclination sensor S2 can be, for example, a biaxial accelerometer that measures an acceleration of the bicycle pedal 12A both horizontally and vertically. In other words, the inclination sensor S2 detects acceleration along two axes (x and y), which are disposed substantially perpendicular to one another. One of the axes of the accelerometer is oriented substantially horizontally, on the x axis, i.e., parallel to the forward direction of travel of bicycle 1. The other axis of the accelerometer is oriented substantially vertically, on the y axis. The accelerometer measures tilt of the pedal spindle 22 of the bicycle pedal 12A with respect to a base axis (e.g., the horizontal axis or the vertical axis). The measurements of the inclination sensor S2 are combined to produce the input signal representative thereof. In the illustrated embodiment, the inclination sensor S2 is fixedly attached to the pedal spindle 22.

Preferably, the bicycle pedal 12A further comprises a wireless transmitter 30 electrically connected to the first and second shear force sensors SS1 and SS2 and the first and second bending force sensors BS1 and B2 via the controller 28. Thus, the controller 28 wirelessly communicates with the cycle computer CC for notifying a rider of the pedaling power being applied to the bicycle pedal 12A. Here, the wireless transmitter 30 is integrated with the controller 28 as a unit that is detachable from the crank arm 16. The controller 28 communicates the signals from the force sensors to the cycle computer CC via the wireless transmitter 30. Moreover, in addition to the shear force data and the bending force data from the force sensors, as discussed below, the wireless transmitter 30 can be configured to transmit wireless data to the cycle computer CC, including RPM data from the cadence sensor S1 and acceleration data from the inclination sensor S2.

The controller 28 is electrically connected to the first, second third and fourth shear force sensors SS1, SS2, SS3 and SS4, and the first, second, third and fourth bending force sensors BS1, BS2, BS3 and BS4 by a communication cord 29. Preferably, the communication cord 29 has a plug-in connector 29a at one end for detachably connecting the force sensors to the controller 28. Preferably, the other end of the communication cord 29 is non-detachably connected to the force sensors. Of course, it will be apparent from this disclosure that the other end of the communication cord 29 could be detachably connected to the first, second third and fourth shear force sensors SS1, SS2, SS3 and SS4, and the first, second, third and fourth bending force sensors BS1, BS2, BS3 and BS4 as needed and/or desired.

In the first embodiment, the cycle computer CC is configured and arranged to receive wireless data from the wireless transmitter 30. The wireless transmitter 30 is electrically connected to each of the first, second, third and fourth shear force sensors SS1, SS2, SS3 and SS4 via the controller 28. Also the wireless transmitter 30 is electrically connected to each of the first, second, third and fourth bending force sensors BS1, BS2, BS3 and BS4 via the controller 28. The wireless connection may be performed using any of a radio frequency (RF), infrared, Bluetooth, ANT or any combination thereof. The actual position of the bicycle pedal 12A relative to rotational axis is determined by signals from the inclination sensor S2 in conjunction with the cadence sensor S1. The controller 28 utilizes signals from the cadence sensor S1 to determine the actual rotational speed of the bicycle pedal 12A and can therefore correlate the detected average strain to the bicycle pedal 12A on bicycle 1. The controller 28 is programmed and/or configured to take into account the shear and bending force variations from each of the shear and bending force sensors using compensating constants.

The controller 28 can be programmed (pre-stored programs) to calculate the pedaling force or power applied to the bicycle pedal 12A in a well-known manner based on the bicycle pedal data (signals) received from the wireless transmitter 30. Then, based on the bicycle pedal data received, the cycle computer CC notifies a rider of the pedaling state of the bicycle pedal 12A.

For example, the controller 28 is provided with software that is programmed to calculate the total pedaling force or total power using the following Formula (1) having pre-stored compensating constants:

$$\begin{pmatrix} F_{ax} \\ F_{ay} \\ M_{ax} \\ M_{ay} \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \cdot \begin{pmatrix} \begin{pmatrix} \varepsilon_1 \\ \varepsilon_2 \\ \varepsilon_3 \\ \varepsilon_4 \end{pmatrix} \end{pmatrix} \quad (1)$$

The term $F_{ax}$ is the calculated shear force exerted on the bicycle pedal 12A in a first axis. Preferably, the first axis extends in a tangential direction of a pedal circle that is traced by the center spindle axis A1 as the bicycle pedal 12A and the crank arm 16 rotate about the crank axis. The term $F_{ay}$ is the calculated shear force exerted on the bicycle pedal 12A in a second axis which is perpendicular to the first axis. The term $M_{ax}$ is the calculated bending moment of the bicycle pedal 12A in the first axis. Preferably the second axis extends in a radial direction with respect to the crankshaft 20. The term $M_{ay}$ is the calculated bending moment of the bicycle pedal 12A in the second axis. The compensation constants $a_{11}$ to $a_{44}$ are predetermined by a cyclist's calibration testing procedure. The term ε refers to data received from the force sensors. The term ε1 refers to data received from shear force sensors SS1 and/or SS3. The term ε2 refers to data received from shear force sensors SS2 and/or SS4. The term ε3 refers to data received from bending force sensors BS1 and/or BS3. The term ε4 refers to data received from bending force sensors BS2 and/or BS4. The above formula includes data ε1 and ε2 for calculating compensation constants from at least two shear force sensors, and data ε3 and ε4 for at least two bending force sensors.

The values of the terms $F_{ax}$ and $F_{ay}$ are used to determine tangential and radial pedaling forces exerted on the bicycle pedal 12A in the tangential direction with respect to the pedal circle of the center spindle axis A1 and in the radial direction with respect to the crankshaft 20. If the first axis is along the tangential direction of pedal circle of the center spindle axis A1, and the second axis is along a radial direction of crankshaft 20, the inclination sensor S2 does not need to calculate the pedaling forces, because the values of the terms $F_{ax}$ and $F_{ay}$ are tangential pedaling force and radial pedaling force respectively. However if the first axis does not extend along the tangential direction of pedal circle of the center spindle axis A1, and the second axis extends in the radial direction of crankshaft 20, the controller calculates a tangential pedaling force and a radial pedaling force based on the values of the terms $F_{ax}$ and $F_{ay}$ and the results from the inclination sensor S2. The relationships between the first axis, the second axis and a base axis of the inclination sensor S2 are predetermined. During set-up, the controller 28 learns the tilt angle between the first axis and the second axis from at least the radial direction and the tangential direction. Then the controller 28 calculates the tangential and radial pedaling forces based on the values of the terms $F_{ax}$ and $F_{ay}$ and the tilt angle. The total power or total pedaling force that is exerted on the bicycle pedal 12A is calculated based on the data received from the cadence sensor S1, the tangential pedaling force and the predetermined distance between the center spindle axis A1 and the crank axis. When calculating the total pedaling force, the controller 28 automatically takes into account the bending moment of the bicycle pedal 12A in the first and second axes. By doing so, the controller 28 compensates for any variations in the bending force exerted on the bicycle pedal 12A that results from a cyclist's shoe pushing on different points of the bicycle pedal during a pedaling cycle. As a result, the controller 28 can calculate a more accurate total pedaling force or total power. Data on the total power exerted on the bicycle pedal 12A is then displayed for the cyclist on the display of the cycle computer CC. Preferably, the cycle computer CC can display the pedaling direction and the pedaling force at the predetermined angles. The cycle computer CC can preferably display a center of the pedaling force exerted by the cyclist on the bicycle pedals 12A and 12B in the axle direction based on the values of the terms $M_{ax}$ and term $M_{ay}$.

As understood in the art, the controller 28 is a microcomputer that includes a central processing unit (CPU) or processor and other conventional components such as an input interface circuit, an output interface circuit, and storage devices such as ROM (Read Only Memory) device and RAM (Random Access Memory) device. The controller 28 is programmed to calculate a pedaling power during a pedal cycle based on data received from the first, second, third and fourth shear force sensors SS1, SS2, SS3 and SS4 and the first, second, third and fourth bending force sensors BS1, BS2, BS3 and BS4. The controller 28 can also be provided with various other control programs that perform various bicycle control operations as needed and/or desired. It will be apparent to those skilled in the bicycle field from this disclosure that the precise structure and algorithms for the controller 28 can be any combination of hardware and software that will carry out the notification functions as discussed herein.

The electrical components of the bicycle pedal 12A can be powered by a battery B (e.g., a dry cell battery and/or rechargeable dry cell battery) that is mounted on the crank arm 16. Here, the battery B is integrated with the controller 28. Alternatively, the power from the dry cells or batteries can be transferred to the electrical components of the bicycle pedal 12A by induction or slip rings or other suitable means. In accordance with some embodiments, power may also be provided by solar cells affixed to the bicycle pedal 12A or the crank 16. According to some embodiments, power for bicycle pedal 12A can be generated from piezoelectric devices which may be independent of, or part of, the force measuring sensors. Moreover, power may be provided by any combination of batteries, solar cells, piezoelectric devices, and induction. The battery B is electrically connected to the shear force sensors SS1, SS2, SS3 and SS4, and to the bending force sensors BS1, BS2, BS3 and BS4.

As seen in FIG. 3, the pedal body 24 is a relatively conventional member. The pedal body 24 is rotatably mounted on the pedal spindle 22 about a center spindle axis A1. The pedal body 24 has a front cleat engagement part 31 that is integrally formed with the pedal body 24. A rear cleat engagement part 32 is pivotally mounted to the pedal body 24 by a pivot pin 34. The rear cleat engagement part 32 is biased to a cleat engagement position by a pair of torsion springs 36. The front and rear cleat engagement parts 31 and 32 releasably engage a cleat (not shown) in a conventional manner. Of course, it will be apparent from this disclosure that other pedal bodies could be used including but not limited to non-cleat type pedal bodies. Thus, the conventional aspects of the pedal body 24 will not be discussed herein.

Referring mainly to FIGS. 5 to 10, the pedal spindle 22 is preferably a multi-step spindle having numerous stepped parts. As seen in FIG. 6, the pedal spindle 22 is received in a stepped bore 38 (only partially shown) of the pedal body 24. Typically, the pedal spindle 22 is secured to the pedal body 24 in a conventional manner. Since these parts are relatively conventional parts and the specific constructions of these parts are not critical to the present embodiment, they will not be discussed or illustrated in detail herein. Rather, only those parts of the bicycle pedal 12A necessary to understand the present embodiment will be discussed.

Figure 5:
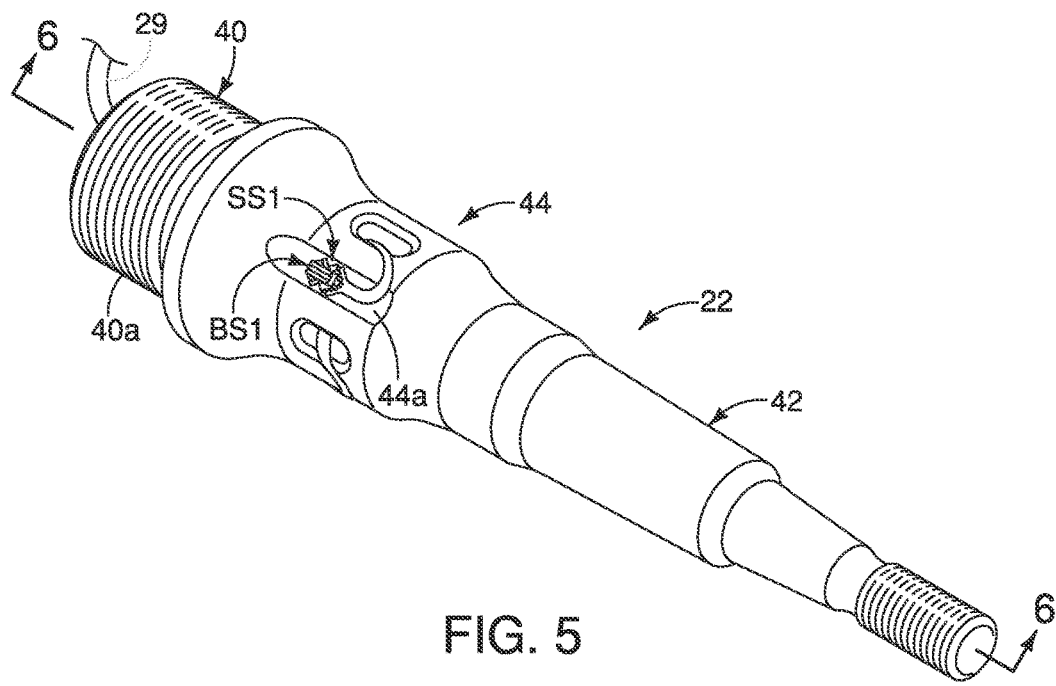
FIG. 5 is a perspective view of the pedal spindle of the bicycle pedal illustrated FIG. 3.

As seen in FIGS. 3, 5 and 6, the pedal spindle 22 includes a crank arm mounting part 40, a pedal body support part 42 and a sensor support part 44. The crank arm mounting part 40 is configured for mounting the bicycle pedal 12A to the crank arm 16. The crank arm mounting part 40 has a thread 40a that screws into a threaded hole fixedly fastened to the crank arm 16. The pedal body support part 42 rotatably supports the pedal body 24. Specifically, a conventional bearing assembly (not shown) is provided between the pedal body support part 42 of the pedal spindle 22 and the pedal body 24. Thus, the pedal body 24 is freely rotatable around the center spindle axis A1. In this way, the pedal spindle 22 is fixedly coupled to the crank arm 16, while the pedal body 24 is rotatably coupled to the pedal spindle 22 on the pedal body support part 42. The sensor support part 44 supports the first, second, third and fourth shear force sensors SS1, SS2, SS3 and SS4 and the first, second, third and fourth bending force sensors BS1, BS2, BS3 and BS4. The sensor support part 44 is axially disposed between the crank arm mounting part and the pedal body support part 42

Figure 7:
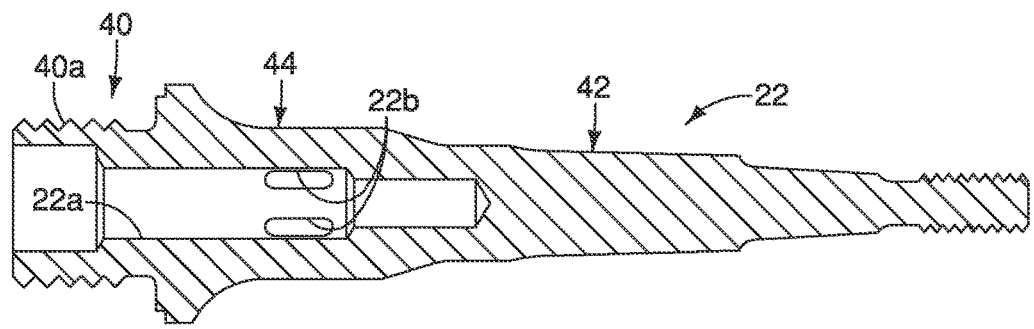
FIG. 7 is a cross sectional view of the pedal spindle as seen along center section line that is perpendicular to section line 6-6 of FIG. 5.
Figure 8:
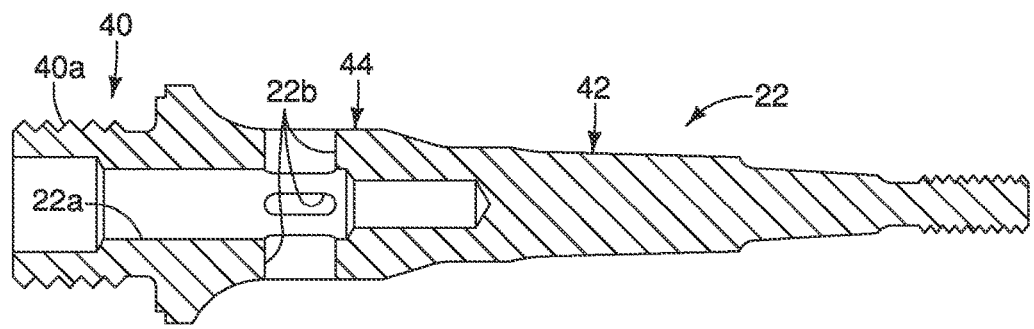
FIG. 8 is a cross sectional view of the pedal spindle as seen along center section line 6-6 of FIG. 5.

As seen in FIGS. 6 through 8, the pedal spindle 22 further includes a first bore 22a that extends axially at least through the crank arm mounting part 40 and at least one second bore 22b that extends from an outer peripheral surface of the pedal spindle 22 to the first bore 22a. The first bore 22a and the at least one second bore 22b are arranged so that the communication cord 29 passes through the first bore 22a and the at least one second bore 22b so that the electrical conductors of the communication cord 29 are connected to the first, second, third and fourth shear force sensors SS1, SS2, SS3 and SS4 and the first, second, third and fourth bending force sensors BS1, BS2, BS3 and BS4.

In the illustrated embodiment, the first bore 22a extends from the end of the pedal spindle 22 completely through both the crank arm mounting part 40 and the sensor support part 44. Also in the illustrated embodiment, as seen in FIGS. 6 and 7, the at least one second bore 22b includes a plurality of the second bores 22b. In particular, the sensor support part 44 of the pedal spindle 22 is provided with four of the second bores 22b, which are circumferentially spaced apart about the outer peripheral surface of the sensor support part 44. The second bores 22b are elongated in the axial direction of the pedal spindle 22. While a particular wiring passage is provided by the first bore 22a and the second bores 22b, it will be apparent to those skilled in the bicycle field from this disclosure that the wiring passage of the pedal spindle 22 for the communication cord 29 can have other configurations as needed and/or desired. For example, the pedal spindle 22 can be configured so that the first bore does not extend into the sensor support part 44 of the pedal spindle 22 and/or so that fewer or more of the second bores 22b are provided.

The first, second, third and fourth shear force sensors SS1, SS2, SS3 and SS4 are each disposed on an outer peripheral surface of the pedal spindle 22 to detect a pedaling force transmitted from the pedal body 24 to the pedal spindle 22. Specifically, first, second, third and fourth shear force sensors SS1, SS2, SS3 and SS4 are circumferentially spaced from each other about the outer peripheral surface of the sensor support part 44 with respect to the center spindle axis A1. Likewise, the first, second, third and fourth bending force sensors BS1, BS2, BS3 and BS4 are disposed the outer peripheral surface of the pedal spindle 22 to detect a pedaling force transmitted from the pedal body 24 to the pedal spindle 22. Specifically, the first, second, third and fourth bending force sensors BS1, BS2, BS3 and BS4 are circumferentially spaced from each other about the outer peripheral surface of the sensor support part 44 with respect to the center spindle axis A1.

In the illustrated embodiment, the outer peripheral surface of the sensor support part 44 includes four sensor mounting portions 44a that are separated by the second bores 22b. The sensor mounting portions 44a can be flat surfaces or curved surfaces. The force sensors are fixedly mounted on the sensor mounting portions 44a. The first, second, third and fourth shear force sensors SS1, SS2, SS3 and SS4 and the first, second, third and fourth bending force sensors BS1, BS2, BS3 and BS4 are disposed on at least one of the mounting portions 44a. In particular, the sensor mounting portions 44a includes four mounting portions 44a that are disposed ninety degrees apart with respect to the center spindle axis A1. Each of the sensor mounting portions 44a is capable of supporting one or more force sensors. While four of the sensor mounting portions 44a are illustrated it will be apparent to those skilled in the bicycle field from this disclosure that the pedal spindle 22 can be configured to include fewer or more sensor mounting portions as needed and/or desired depending on the configuration and/or arrangement of force sensors.

Figure 10:
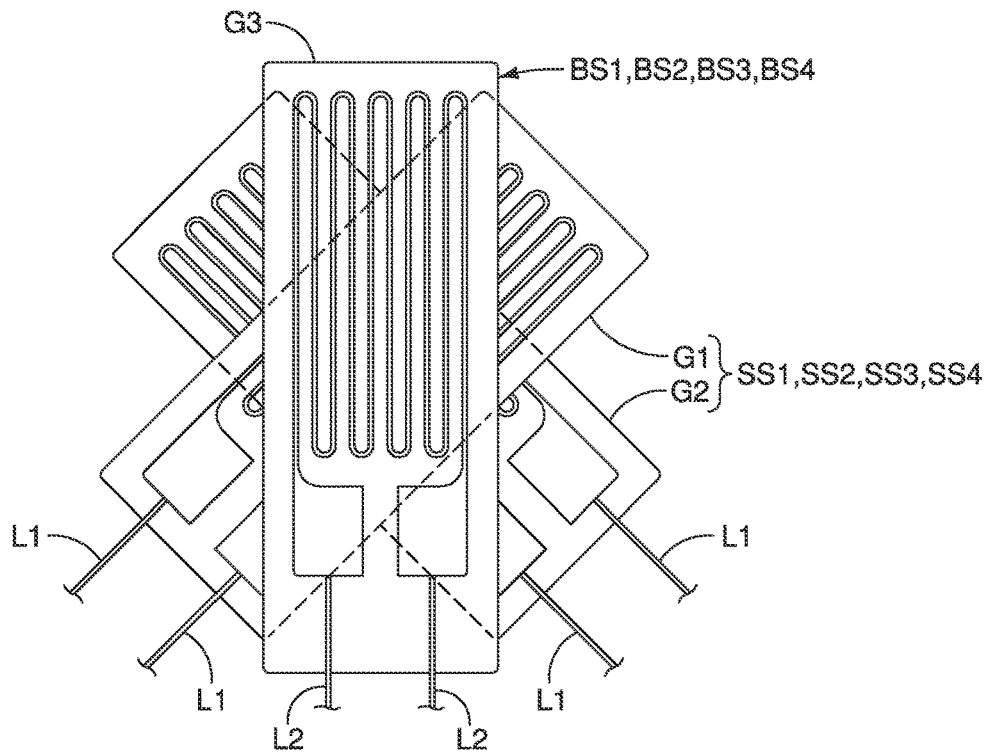
FIG. 10 is an enlarged top plan view of one set of force sensors that are installed in a first pattern on a sensor support part of the pedal spindle illustrated in FIGS. 4 to 9.

Preferably, as seen in FIG. 10, each of the first, second, third and fourth shear force sensors SS1, SS2, SS3 and SS4 includes a pair of shear strain gauges G1 and G2 that each are either resistance strain gauges or semiconductor strain gauges. The first, second, third and fourth shear force sensors SS1, SS2, SS3 and SS4 are fixed to the sensor mounting portions 44a using a conventional adhesive appropriate for strain gauges, The shear strain gauges G1 and G2 are arranged non-parallel to the center spindle axis A1. The shear strain gauges G1 and G2 are also angularly offset with respect to each other. On the other hand, each of the first, second, third and fourth bending force sensors BS1, BS2, BS3 and BS4 only include a single bending strain gauge G3 that is either resistance strain gauges or semiconductor strain gauges. The first, second, third and fourth bending force sensors BS1, BS2, BS3 and BS4 are fixed to the sensor mounting portions 44a using a conventional adhesive appropriate for strain gauges. The bending strain gauges G3 are arranged parallel to the center spindle axis A1. Preferably, the bending strain gauges G3 of the first, second, third and fourth bending force sensors BS1, BS2, BS3 and BS4 are arranged such that they are overlaid on top of the corresponding one of the shear strain gauges G1 and G2 of the first, second, third and fourth shear force sensors SS1, SS2, SS3 and SS4 respectively.

As previously mentioned, the sensor support part 44 of the pedal spindle 22 includes four of the sensor mounting portions 44a that are circumferentially spaced ninety degrees apart with respect to the center spindle axis A1. The shear strain gauges G1 and G2 of the first shear force sensor SS1 and the bending strain gauge G3 of the first bending force sensor BS1 are mounted on a first of the sensor mounting portions 44a. The shear strain gauges G1 and G2 of the second shear force sensor SS2 and the bending strain gauge G3 of the second bending force sensor BS2 are mounted on a second of the mounting portions 44a that is circumferentially spaced ninety degrees from the first of the mounting portions 44a. The shear strain gauges G1 and G2 of the third shear force sensor SS3 and the bending strain gauge G3 of the third bending force sensor BS3 are mounted on a third of the mounting portions 44a that is circumferentially spaced ninety degrees from the second of the mounting portions 44a. The shear strain gauges G1 and G2 of the fourth shear force sensor SS4 and the bending strain gauge G3 of the fourth bending force sensor BS4 are mounted on a fourth of the mounting portions 44a that is circumferentially spaced ninety degrees from the third of the mounting portions 44a.

As seen in FIG. 10, the shear strain gauges G1 and G2 of each of the first, second, third, fourth shear force sensors SS1, SS2, SS3 and SS4 has a communication line (i.e., a pair of wires L1). Also the bending strain gauge G3 of each of the first, second, third, fourth bending force sensors BS1, BS2, BS3 and BS4 has a communication line (i.e., a pair of wired L2). The wires L1 and L2 of the communication lines extend through the at least one second bore 22b and the first bore 22a. The wires L1 and L2 of the communication lines are signal conductors of the communication cord 29 for carrying electrical signals from the force sensors SS1 to BS4 to the controller 28. Once the force sensors SS1 to BS4 have been installed on the sensor support part 44 of the pedal spindle 22 with the communication lines of the communication cord 29 extending through the bores 22a and 22b, then the first bore 22a and/or the second bores 22b can be filled in with a resin material or other similar adhesive material that retains the communication lines in position within the second bores 22b.

Preferably, as seen in FIG. 10, each of the first, second, third and fourth shear force sensors SS1, SS2, SS3 and SS4 includes a pair of shear strain gauges G1 and G2 that each are either resistance strain gauges or semiconductor strain gauges. The first, second, third and fourth shear force sensors SS1, SS2, SS3 and SS4 are fixed to the sensor mounting portions 44a using a conventional adhesive appropriate for strain gauges. Each of the shear strain gauges G1 and G2 has a longitudinal axis that is arranged non-parallel to the center spindle axis A1. As seen in FIG. 10, the longitudinal axes of the strain gauges G1 and G2 extend in a direction parallel to a measurement direction of a grid of the strain gauges G1 and G2, respectively. The shear strain gauges G1 and G2 are also angularly offset with respect to each other. On the other hand, each of the first, second, third and fourth bending force sensors BS1, BS2, BS3 and BS4 only include a single bending strain gauge G3 that is either resistance strain gauges or semiconductor strain gauges. The first, second, third and fourth bending force sensors BS1, BS2, BS3 and BS4 are fixed to the sensor mounting portions 44a using a conventional adhesive appropriate for strain gauges. Each of the bending strain gauges G3 has a longitudinal axis that is arranged parallel to the center spindle axis A1. Thus, the longitudinal axes of the first and second bending force sensors BS1 and BS2 extend in a direction parallel to a measurement direction of a grid of the bending strain gauges G3 of the first and second bending force sensors BS1 and BS2, respectively. Preferably, the bending strain gauges G3 of the first, second, third and fourth bending force sensors BS1, BS2, BS3 and BS4 are arranged such that they are overlaid on top of the corresponding one of the shear strain gauges G1 and G2 the first, second, third and fourth shear force sensors SS1, SS2, SS3 and SS4 respectively.

Figure 11:
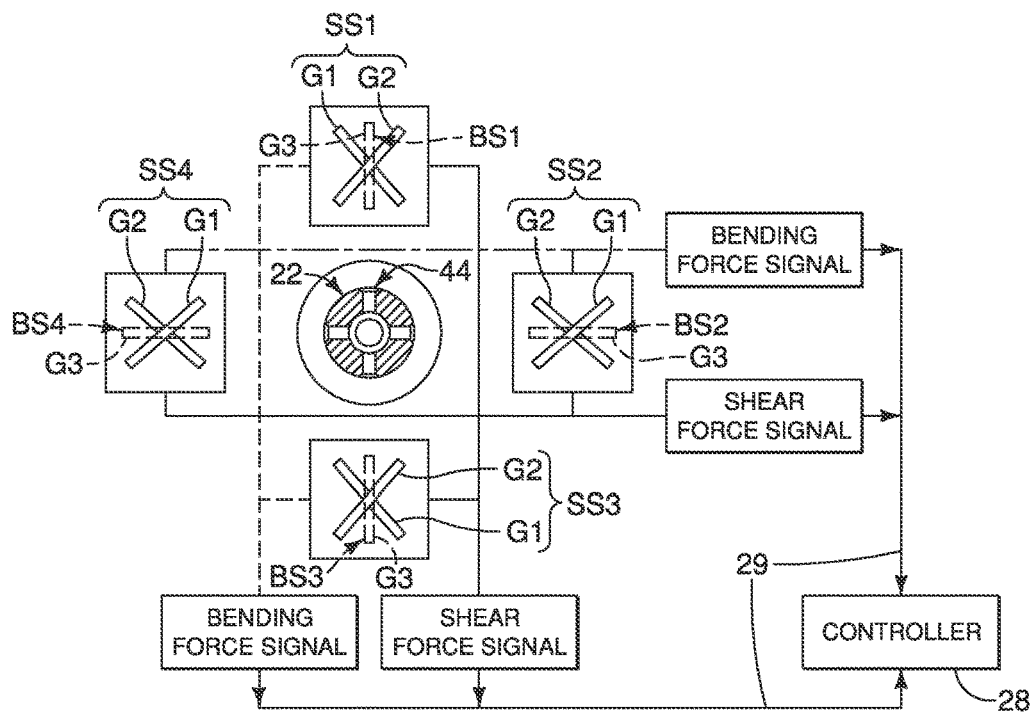
FIG. 11 is a schematic illustration of a first configuration of the force sensors mounted on the pedal spindle in the first pattern of FIG. 10.

The first configuration is diagrammatically illustrated in FIG. 11. The first and third shear force sensors SS1 and SS3 are configured to form a conventional Wheatstone bridge circuit (not shown) with two registration elements and to provide data for the term $\varepsilon 1$ in Formula (1) above. The second and fourth shear force sensors SS2 and SS4 are also configured to form a conventional Wheatstone bridge circuit (not shown) and to provide data for the term $\varepsilon 2$ in Formula (1) above. The first and third bending force sensors BS1 and BS3 are configured to form a conventional Wheatstone bridge circuit (not shown) with two other registration elements on the circuit board and to provide data for the term $\varepsilon 3$ in Formula (1) above. The second and fourth bending force sensors BS2 and BS4 are configured to form a conventional Wheatstone bridge circuit (not shown) with two other registration elements on the circuit board and to provide data for the term $\varepsilon 4$ in Formula (1) above. The resulting voltages of each of the Wheatstone bridge circuits' outputs are provided to the controller 28 as the basis for the value of shear strain and the bending strain on the bicycle pedal 12A.

A signal amplifying circuit (not shown) can be electrically connected to the shear force sensors SS1 to SS4 and the bending force sensors BS1 to BS4 as needed and/or desired. Since signal amplifying circuits are known, the signal amplifying circuit will not be discussed and/or illustrated in detail herein. In any case, in the first configuration, the shear strain on the pedal spindle 22 of the bicycle pedal 12A is measured by the first, second, third and fourth shear force sensors SS1, SS2, SS3 and SS4. The bending strain on the pedal spindle 22 of the bicycle pedal 12A is measured by the first, second, third and fourth bending force sensors BS1, BS2, BS3 and BS4.

As diagrammatically illustrated in FIG. 11, in the first configuration, the first shear force sensor SS1 and the first bending force sensor BS1 are mounted on the same one of the sensor mounting portions 44a. The second shear force sensor SS2 and the second bending force sensor BS2 are mounted on the same one of the sensor mounting portions 44a. The third shear force sensor SS3 and the third bending force sensor BS3 are mounted on the same one of the sensor mounting portions 44a. The fourth shear force sensor SS4 and the fourth bending force sensor BS4 are mounted on the same one of the sensor mounting portions 44a. Preferably, the first, second, third and fourth bending force sensors BS1, BS2, BS3 and BS4 are arranged such that they are overlaid on top of the first, second, third and fourth shear force sensors SS1, SS2, SS3 and SS4 respectively.

Thus, the first and third shear force sensors SS1 and SS3 are mounted across from each other on the sensor support part 44. The third and fourth shear force sensors SS3 and SS4 are disposed ninety degrees apart with respect to each other on the center spindle axis A1. Thus, the second and fourth shear force sensors SS2 and SS4 are mounted across from each other on the sensor support part 44. In this way, the first shear force sensor SS1 is circumferentially spaced from the second shear force sensor SS2 on the sensor support part 44 with respect to the center spindle axis A1. Likewise, the third and fourth shear force sensors SS3 and SS4 are circumferentially spaced from the first and second shear force sensor SS1 and SS2 on the sensor support part 44 with respect to the center spindle axis A1. The first, second, third and fourth shear force sensors SS1, SS2, SS3 and SS4 are each disposed ninety degrees apart from each other with respect to the center spindle axis A1. The first, second, third and fourth bending force sensors BS1, BS2, BS3 and BS4 are each disposed ninety degrees apart with respect to the center spindle axis A1.

The first and third shear force sensors SS1 and SS3 are preferably identical to one another, except that they are mounted on parallel ones of the sensor mounting portions 44a. Similarly, the second and fourth shear force sensors SS2 and SS4 are preferably identical to one another, except that they are mounted on parallel ones of the sensor mounting portions 44a.

Also preferably, in the first configuration, each of the first, second, third and fourth shear force sensors SS1, SS2, SS3 and SS4 are selected from the group consisting resistance strain gauges and semiconductor strain gauges. Likewise, preferably in the first embodiment, each of first, second, third and fourth bending force sensors BS1, BS2, BS3 and BS4 are selected from the group consisting resistance strain gauges and semiconductor strain gauges.

Figure 12:
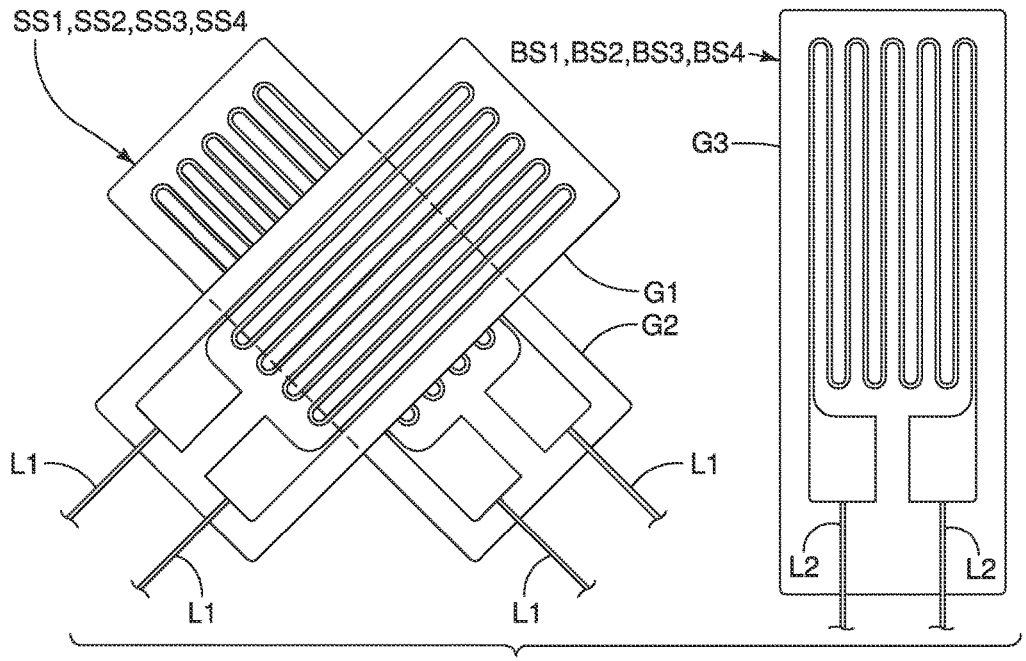
FIG. 12 is an enlarged top plan view of one set of force sensors that are installed in a second pattern on the pedal spindle illustrated in FIGS. 4 to 9.
Figure 13:
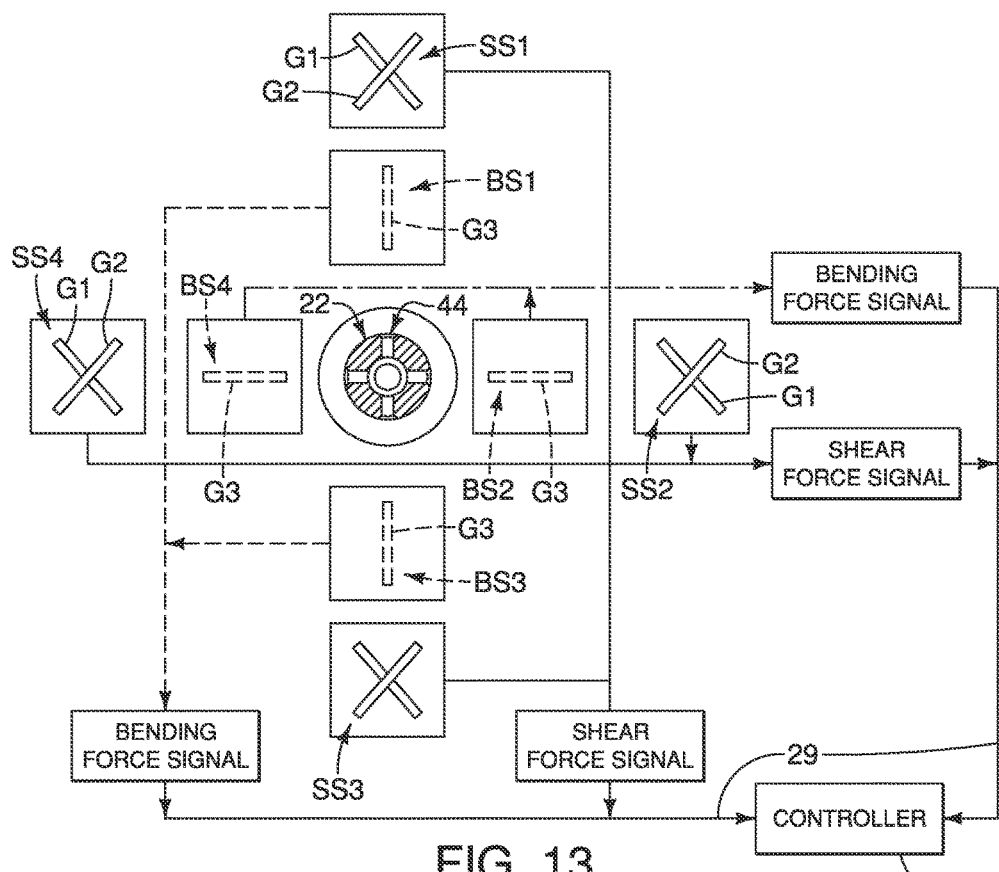
FIG. 13 is a schematic illustration of a second configuration of the force sensors mounted in the second pattern of FIG. 12 on the pedal spindle illustrated in FIGS. 4 to 9.

Referring now to FIGS. 12 and 13, a second configuration is schematically illustrated showing eight force sensors being mounted on the sensor support part 44 in a second pattern of FIG. 12. Here, as shown in FIG. 13, the shear force sensors SS1, SS2, SS3 and SS4 each have a pair of the shear strain gauges G1 and G2 that are also angularly offset with respect to each other, while the bending force sensors BS1, BS2, BS3 and BS4 each have a single bending strain gauge G3. However, here, the bending strain gauge G3 does not overlie the shear strain gauges G1 and G2. Thus, here, as shown in FIG. 13, the shear force sensors SS1, SS2, SS3 and SS4 do not overlap with the bending force sensors BS1, BS2, BS3 and BS4. Otherwise, the force sensors SS1, SS2, SS3, SS4, BS1, BS2, BS3 and BS4 are arranged in the same manner as discussed above with respect to FIG. 11.

As diagrammatically illustrated in FIG. 13, the first and third shear force sensors SS1 and SS3 are configured to form a conventional Wheatstone bridge circuit (not shown) with two registration elements on the circuit board and to provide data for the term $\varepsilon 1$ in Formula (1) above. The second and fourth shear force sensors SS2 and SS4 are configured to form a conventional Wheatstone bridge circuit (not shown) with two other registration elements on the circuit board and to provide data for the term $\varepsilon 2$ in Formula (1) above. The first and third bending force sensors BS1 and BS3 are configured to form conventional Wheatstone bridge circuits (not shown) with three other registration elements on the circuit board and to provide data for the term $\varepsilon 3$ in Formula (1) above. The second and fourth bending force sensors BS2 and BS4 are configured to form a conventional Wheatstone bridge circuits (not shown) with three other registration elements on the circuit board and to provide data for the term $\varepsilon 4$ in Formula (1) above.

Figure 14:
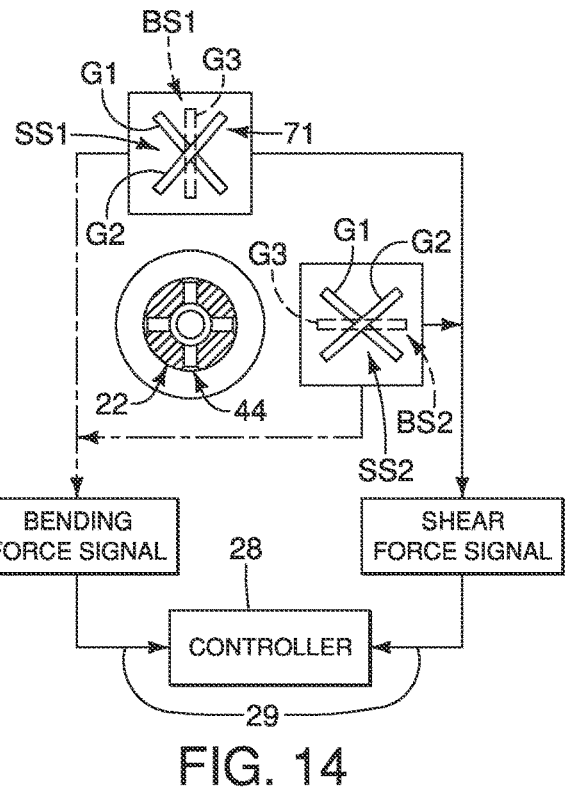
FIG. 14 is a schematic illustration of a third configuration of the force sensors mounted in the first pattern of FIG. 10 on the pedal spindle illustrated in FIGS. 4 to 9.

Referring to FIG. 14, a third configuration is schematically illustrated showing four force sensors being mounted on the sensor support part 44 in the first pattern of FIG. 10. In other words, in this third configuration, the force sensors SS3, SS4, BS3 and BS4 have been omitted, but otherwise, the force sensors SS1, SS2, BS1 and BS2 are arranged as discussed in the first embodiment. Thus, here, only the force sensors SSS1, SS2, BS1 and BS2 are used for detecting the strain applied to the pedal spindle 22 by the pedaling force applied to the pedal body 24 during pedaling. The force sensors SS1, SS2, BS1 and BS2 transmit the shear and bending signals to the controller 28, which then calculates the pedaling force applied to the pedal body 24 during pedaling.

The first and second shear force sensors SS1 and SS2 each have a pair of strain gauges G1 and G2 that are also angularly offset with respect to each other and arranged non-parallel to the center spindle axis A1 in the same manner as mentioned. In other words, at least one of the first and second shear force sensors SS1 and SS2 has a longitudinal axis that is parallel to the center spindle axis A1. At least one of the first and second bending force sensors BS1 and BS2 has a longitudinal axis that is not parallel to the center spindle axis A1. The bending strain gauges G3 are arranged parallel to the center spindle axis A1 in the same manner as mentioned. In particular, the first and second shear force sensors SS1 and SS2 are disposed ninety degrees apart with respect to the center spindle axis A1. Also the first and second shear force sensors SS1 and SS2 are angularly offset from the first and second bending force sensors BS1 and BS2 with respect to the center spindle axis A1. The first and second bending force sensors BS1 and BS2 are disposed ninety degrees apart with respect to the center spindle axis A1.

Also preferably, with this third configuration, each of the first and second shear force sensors SS1 and SS2 are selected from the group consisting of resistance strain gauges and semiconductor strain gauges. Likewise, preferably, with this third configuration, the first and second bending force sensors BS1 and BS2 are selected from the group consisting of resistance strain gauges and semiconductor strain gauges.

Figure 15:
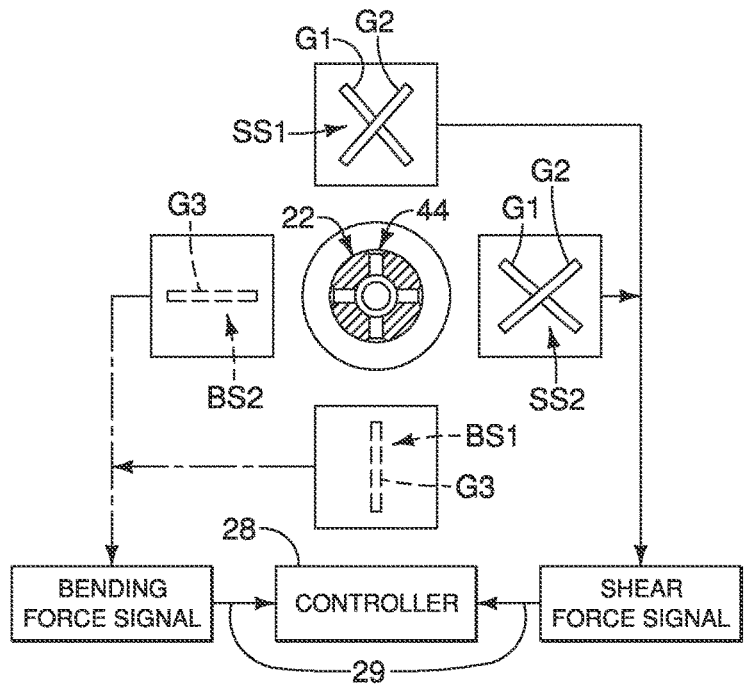
FIG. 15 is a schematic illustration of a fourth configuration of the force sensors mounted in a third pattern on the pedal spindle illustrated in FIGS. 4 to 9.

Referring to FIG. 15, a fourth configuration is schematically illustrated showing four force sensors being mounted on the sensor support part 44 in a third pattern. Here, in this fourth configuration, the force sensors SS3, SS4, BS3 and BS4 have been omitted, and the first and second shear force sensors SS1 and SS2 are arranged at different locations from the first and second bending force sensors BS1 and BS2. Thus, only the force sensors SS1, SS2, BS1 and BS2 are used for detecting the strain applied to the pedal spindle 22 by the pedaling force applied to the pedal body 24 during pedaling. The force sensors SS1, SS2, BS1 and BS2 transmit the shear and bending signals to the controller 28, which then calculates the pedaling force applied to the pedal body 24 during pedaling.

The first and second shear force sensors SS1 and SS2 each have a pair of shear strain gauges G1 and G2 that are also angularly offset with respect to each other and arranged non-parallel to the center spindle axis A1 in the same manner as mentioned. The bending strain gauges G3 are arranged parallel to the center spindle axis A1 in the same manner as mentioned. In particular, the first shear force sensor SS1 is disposed opposite to the first bending force sensor BS1 with respect to the center spindle axis A1. Likewise, the second shear force sensor SS2 is disposed opposite to the second bending force sensor BS2 with respect to the center spindle axis A1. The first and second shear force sensors SS1 and SS2 are disposed ninety degrees apart with respect to the center spindle axis A1. Also the first and second shear force sensors SS1 and SS2 are angularly offset from the first and second bending force sensors BS1 and BS2 with respect to the center spindle axis A1. The first and second bending force sensors BS1 and BS2 are disposed ninety degrees apart with respect to the center spindle axis A1. Also the first shear force sensor SS1 is angularly aligned with the first bending force sensor BS1 with respect to the center spindle axis A1. The second shear force sensor SS2 is angularly aligned with the second bending force sensor BS2 with respect to the center spindle axis A1.

Also preferably, with this fourth configuration, each of the first and second shear force sensors SS1 and SS2 are selected from the group consisting of resistance strain gauges and semiconductor strain gauges. Likewise, preferably, with this fourth configuration, the first and second bending force sensors BS1 and BS2 are selected from the group consisting of resistance strain gauges and semiconductor strain gauges.

In all of the configuration of the force sensors, it will be apparent from this disclosure that the remaining structure of the bicycle pedal 12A is the same as discussed above with respect to FIGS. 1 to 9.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle pedal. Accordingly, these directional terms, as utilized to describe the bicycle pedal should be interpreted relative to a bicycle in an upright riding position on a horizontal surface and that is equipped with the bicycle pedal. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the bicycle field from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle pedal comprising:
   a pedal spindle including a crank arm mounting part;
   a pedal body rotatably mounted on the pedal spindle about a center spindle axis;
   a first shear force sensor disposed on the pedal spindle to detect a first shear component of a pedaling force with respect to the center spindle axis;
   a second shear force sensor disposed on the pedal spindle to detect a second shear component of the pedaling force with respect to the center spindle axis, each of the first and second shear force sensors including a strain gauge having a longitudinal axis that is not parallel to the center spindle axis, the longitudinal axes of the strain gauges of the first and second shear force sensors extending in a direction parallel to a measurement direction of a grid of the strain gauges of the first and second shear force sensors, respectively;
   a first bending force sensor disposed on the pedal spindle to detect a first bending component of the pedaling force with respect to the center spindle axis; and
   a second bending force sensor disposed on the pedal spindle to detect a second bending component of the pedaling force with respect to the center spindle axis, each of the first and second bending force sensors including a strain gauge having a longitudinal axis that is parallel to the center spindle axis, the longitudinal axes of the first and second bending force sensors extending in a direction parallel to a measurement direction of a grid of the strain gauges of the first and second bending force sensors, respectively,
   the pedal spindle further including a first bore extending axially at least through the crank arm mounting part, and at least one second bore extending from an outer peripheral surface of the pedal spindle to the first bore, and
   each of the first and second shear force sensors and the first and second bending force sensors having a communication line that extends through the at least one second bore and the first bore.

2. The bicycle pedal according to claim 1, wherein
the first and second shear force sensors are disposed on the outer peripheral surface of the pedal spindle.

3. The bicycle pedal according to claim 1, wherein
the first and second bending force sensors are disposed on the outer peripheral surface of the pedal spindle.

4. The bicycle pedal according to claim 3, wherein
the first and second shear force sensors are disposed on the outer peripheral surface of the pedal spindle.

5. The bicycle pedal according to claim 4, wherein
the first shear force sensor is circumferentially spaced from the second shear force sensor about the outer peripheral surface with respect to the center spindle axis, and
the first bending force sensor is circumferentially spaced from the second bending force sensor about the outer peripheral surface with respect to the center spindle axis.

6. The bicycle pedal according to claim 5, wherein
the pedal spindle further includes a pedal body support part and a sensor support part, the pedal body support part rotatably supporting the pedal body, the sensor support part supporting the first and second shear force sensors and the first and second bending force sensors, and the sensor support part being axially disposed between the crank arm mounting part and the pedal body support part.

7. The bicycle pedal according to claim 5, wherein
the first and second shear force sensors are selected from a first group consisting of resistance strain gauges and semiconductor strain gauges, and
the first and second bending force sensors are selected from a second group consisting resistance strain gauges and semiconductor strain gauges.

8. The bicycle pedal according to claim 5, wherein
the first and second shear force sensors are disposed ninety degrees apart with respect to the center spindle axis, and
the first and second bending force sensors are disposed ninety degrees apart with respect to the center spindle axis.

9. The bicycle pedal according to claim 5, further comprising
a third shear force sensor arranged relative to the pedal spindle to detect a third shear component of the pedaling force with respect to the center spindle axis;
a fourth shear force sensor arranged relative to the pedal spindle to detect a fourth shear component of the pedaling force with respect to the center spindle axis;
a third bending force sensor arranged relative to the pedal spindle to detect a third bending component of the pedaling force with respect to the center spindle axis; and
a fourth bending force sensor arranged relative to the pedal spindle to detect a fourth bending component of the pedaling force with respect to the center spindle axis.

10. The bicycle pedal according to claim 9, wherein
the first, second, third and fourth shear force sensors are disposed on the outer peripheral surface of the pedal spindle, and
the first, second, third and fourth bending force sensors are disposed on the outer peripheral surface of the pedal spindle.

11. The bicycle pedal according to claim 10, wherein
the first, second, third and fourth shear force sensors are circumferentially spaced from each other about the outer peripheral surface with respect to the center spindle axis, and the first, second, third and fourth shear bending force sensors are circumferentially spaced from each other about the outer peripheral surface with respect to the center spindle axis.

12. The bicycle pedal according to claim 11, wherein
the first, second, third and fourth shear force sensors are selected from a first group consisting of resistance strain gauges and semiconductor strain gauges, and
the first, second, third and fourth bending force sensors are selected from a second group consisting resistance strain gauges and semiconductor strain gauges.

13. The bicycle pedal according to claim 10, wherein
the first, second, third and fourth shear force sensors are disposed ninety degrees apart with respect to the center spindle axis, and
the first, second, third and fourth bending force sensors are disposed ninety degrees apart with respect to the center spindle axis.

14. The bicycle pedal according to claim 1, wherein the at least one second bore includes a plurality of second bores.

15. The bicycle pedal according to claim 1, wherein
the first shear force sensor is disposed opposite to the first bending force sensor with respect to the center spindle axis, and
the second shear force sensor is disposed opposite to the second bending force sensor with respect to the center spindle axis.

16. The bicycle pedal according to claim 1, wherein
the first shear force sensor is angularly aligned with the first bending force sensor with respect to the center spindle axis, and
the second shear force sensor is angularly aligned with the second bending force sensor with respect to the center spindle axis.

17. The bicycle pedal according to claim 1, further comprising
an inclination sensor attached to one of the pedal body and the pedal spindle.

18. A bicycle pedaling state apparatus including the bicycle pedal according to claim 1, further comprising
a controller configured to be detachably fixed to the crank arm and in communication with the first and second shear force sensors and the first and second bending force sensors.

19. The bicycle pedaling state apparatus according to claim 18, wherein
the controller is programmed to calculate a pedaling power during a pedal cycle based on data received from the first and second shear force sensors and the first and second bending force sensors.

20. The bicycle pedaling state apparatus according to claim 19, further comprising
a cadence sensor in communication with the controller.

21. A bicycle pedaling state apparatus including the bicycle pedal according to claim 1, further comprising
a wireless transmitter electrically connected to the first and second shear force sensors and the first and second bending force sensors.

22. A bicycle pedal spindle comprising:
a crank arm mounting part;
a pedal body support part configured to rotatably support a pedal body about a center spindle axis; and
a sensor support part including
a first shear force sensor disposed on the pedal spindle to detect a first shear component of a pedaling force with respect to the center spindle axis;
a second shear force sensor arranged disposed on the pedal spindle to detect a second shear component of the pedaling force with respect to the center spindle axis, each of the first and second shear force sensors including a strain gauge having a longitudinal axis that is not parallel to the center spindle axis, the longitudinal axes of the strain gauges of the first and second shear force sensors extending in a direction parallel to a measurement direction of a grid of the strain gauges of the first and second shear force sensors, respectively;
a first bending force sensor disposed on the pedal spindle to detect a first bending component of the pedaling force with respect to the center spindle axis; and
a second bending force sensor disposed on the pedal spindle to detect a second bending component of the pedaling force with respect to the center spindle axis, each of the first and second bending force sensors including a strain gauge having a longitudinal axis that is parallel to the center spindle axis, the longitudinal axes of the first and second bending force sensors extending in a direction parallel to a measurement direction of a grid of the strain gauges of the first and second bending force sensors, respectively,
the pedal spindle further including a first bore extending axially at least through the crank arm mounting part, and at least one second bore extending from an outer peripheral surface of the pedal spindle to the first bore, and
each of the first and second shear force sensors and the first and second bending force sensors having a communication line that extends through the at least one second bore and the first bore.

* * * * *